Aug. 7, 1934.  W. B. FREEMAN  1,969,067
METHOD OF AND APPARATUS FOR MAKING BELTS
Filed Sept. 16, 1932  2 Sheets-Sheet 1
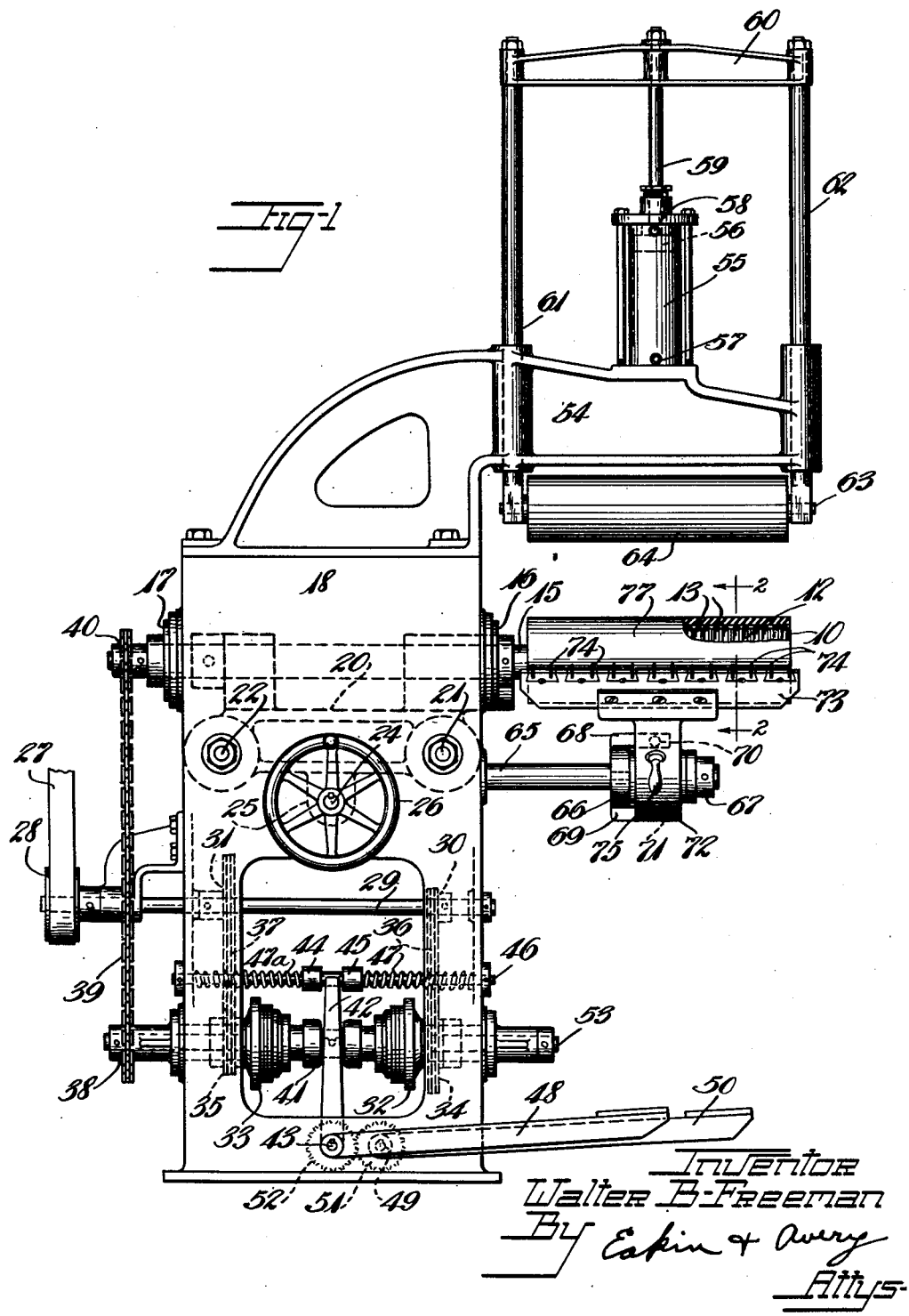

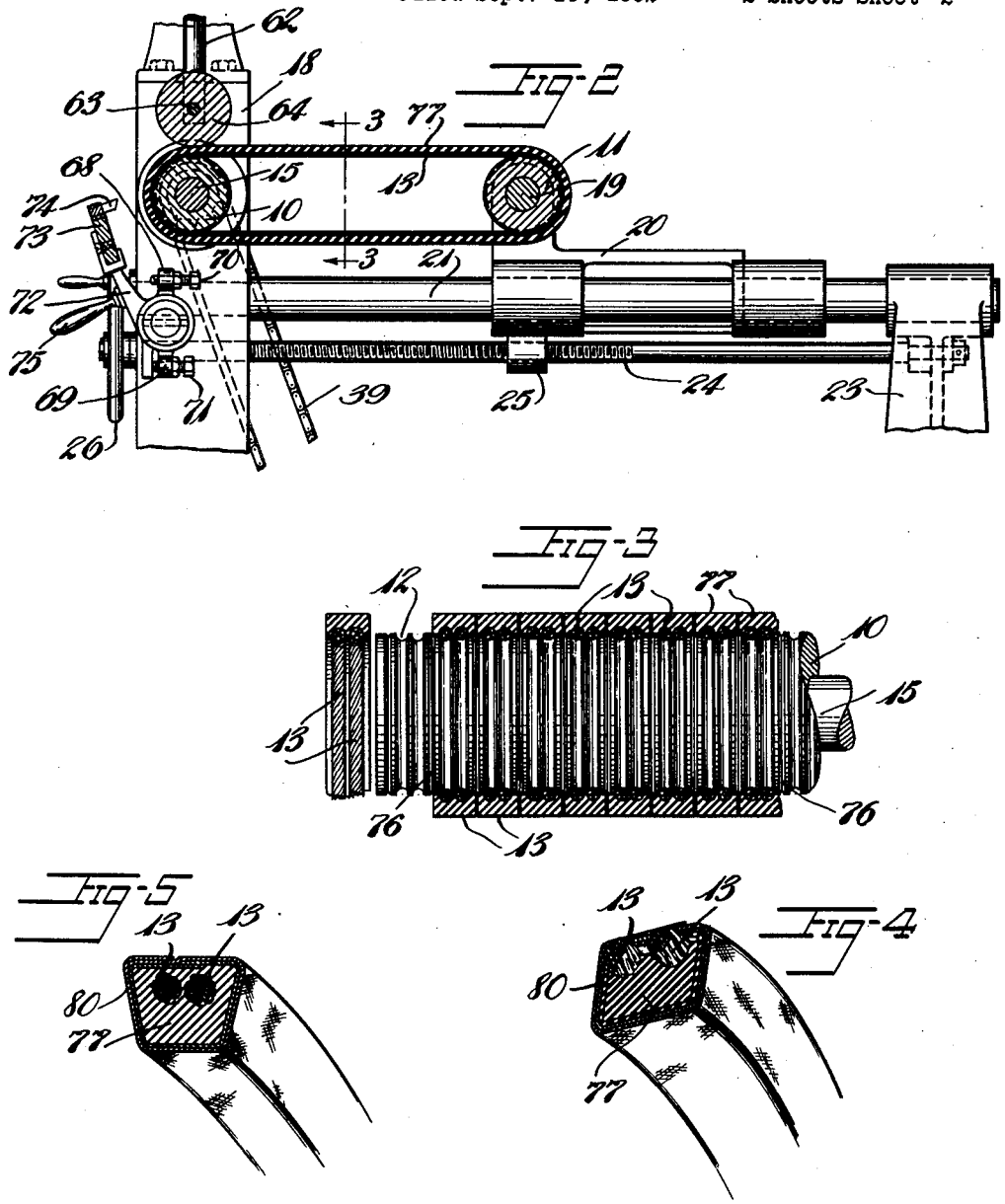

Patented Aug. 7, 1934

1,969,067

UNITED STATES PATENT OFFICE 1,969,067

METHOD OF AND APPARATUS FOR MAKING BELTS

Walter B. Freeman, Cuyahoga Falls, Ohio, assignor to The B. F. Goodrich Company, New York, N. Y., a corporation of New York Application September 16, 1932, Serial No. 633,449

9 Claims. (Cl. 154—4)

This invention relates to a method of and apparatus for making power transmission belts and relates especially to the manufacture of belts comprising a fibrous non-elastic core embedded in a body of elastic rubber compound.

The principal objects of the invention are to provide a method and apparatus whereby accurate alignment of the fibrous cores within the rubber body may be accomplished and to provide a method and apparatus whereby operations on a plurality of belts may be simultaneously conducted.

Other objects will appear from the following description, reference being made to the accompanying drawings.

In the drawings:

Fig. 1 is an end elevation of the belt forming apparatus with a band of belt forming material thereon, part of the band being broken away.

Fig. 2 is a side elevation of the apparatus taken in section on line 2—2 of Fig. 1, parts being broken away.

Fig. 3 is a vertical section taken on line 3—3 of Fig. 2 showing one of the belt core supporting drums, the belt bodies having been cut apart and one of the bodies being shown as removed from the supporting drum.

Fig. 4 is a perspective view of a section of an unvulcanized belt.

Fig. 5 is a similar view of the finished belt.

Referring to the drawings, the invention contemplates the provision of a pair of belt core supporting drums 10 and 11 spaced from each other in parallelism and each provided with aligned grooves 12 for supporting a plurality of non-extensible belt cores 13 in spaced arrangement. Drum 10 is mounted on a shaft 15 horizontally journaled in bearings 16 and 17 in a pedestal 18. The other drum 11 is rotatably mounted on a shaft 19 supported by a cross-head 20, slidably mounted on a pair of rods 21 and 22 horizontally disposed at 90 degrees to shaft 16 and having their opposite ends supported by the pedestal 18 and a second pedestal 23 spaced therefrom. A feed screw 24, arranged parallel to rods 21 and 22, and journaled in pedestals 18 and 23 engages a threaded lug 25, carried by cross-head 20, and is provided with a hand wheel 26, whereby the drum 11 may be adjusted with respect to drum 10.

Power from any convenient source such as an electric motor (not shown) is applied by means of a belt 27 to a pulley 28 mounted on a shaft 29 journaled in pedestal 18 and parallel to shaft 15. Shaft 29 has fixed thereon a pair of sprockets 30 and 31 from which a pair of clutch members 32 and 33, rotatably mounted on a counter shaft 53, and provided with fixed sprocket wheels 34 and 35, are driven by chains 36 and 37. A sprocket 38 mounted on shaft 53 engages a chain 39 which in turn engages a sprocket wheel 40 fixed to shaft 15. A clutch member 41 is slidably mounted on shaft 53 and feather keyed thereto. A clutch-yoke 42, pivoted to the pedestal by a shaft 43, engages the clutch member 41 and may be operated to engage either the clutch member 32 or 33. The upper end of yoke 42 is forked to engage between a pair of collars 44 and 45, slidably mounted on a rod 46, fixed to pedestal 18. A pair of compression coil springs 47 and 47ª encircle the rod 46 and each impinges a wall of the pedestal and one of the collars 44 and 45, the arrangement being such that the yoke 42 and clutch member 41 are normally held in a central or disengaged position.

A pedal lever 48 is fixed to shaft 43 and may be depressed, thereby compressing spring 47 and engaging clutch member 41 with clutch member 32 and causing drum 10 to rotate at a slow speed, sprockets 30 and 34 being of such respective sizes as to cause a reduction in speed between shafts 29 and 53. On release of pedal 48, shaft 53 will be disengaged from clutch member 32.

A shaft 49 is journaled in pedestal 18, parallel to shaft 43 and has fixed thereto a pedal lever 50 and a gear 51. A gear 52 fixed to shaft 43 engages gear 51, the arrangement being such that when pedal lever 50 is depressed spring 47ª is compressed and clutch member 41 engages clutch member 33 causing drum 10 to rotate at a higher speed, sprockets 35 and 37 being of such respective sizes as to cause an increase in speed between shafts 29 and 53. On release of pedal 50, shaft 53 will be disengaged from clutch member 33.

An arm 54, fixed to pedestal 18 and overhanging the drum 10, supports a fluid pressure cylinder 55 in which a piston 56 is adapted to be raised or lowered by fluid admitted to the cylinder through ports 57 and 58. A piston rod 59 attached to piston 56 has a cross-head 60 attached to its upper end which in turn is attached to the upper ends of a pair of rods 61 and 62, vertically slidable in arm 54. The lower extremities of rods 61 and 62 are formed to provide bearings for a horizontally disposed shaft 63 which has a roller 64 mounted thereon, the arrangement being such that when fluid is admitted to port 58, rods 61 and 62 will descend and press roll 64 against the drum 10 and any intervening material, and when the fluid is admitted to port 57 the roller 64 will be raised from contact with drum 10.

A rod 65, fixed to pedestal 18, extends therefrom below shaft 15 and parallel thereto, and has fixed thereto a pair of spaced collars 66 and 67. Collar 66 is provided with a pair of axially extending lugs 68 and 69 in which are mounted adjustable stops 70 and 71. An arm 72 is rotatably mounted on rod 65 between collars 66 and 67 and supports a knife bar 73 in which a plurality of knife blades 74 are mounted in spaced relation facing the drum 10. A handle 75 fixed to arm 72 provides a convenient means of forcing the blades toward or retracting them from the drum, the arrangement being such that the stops 70 and 71 limit the travel of the blades.

Where more than one of the non-extensible cores 13 are to be incorporated in a single belt the grooves 12 in the drum 10 are arranged in sets with knife clearance grooves 76 between sets and the knife blades 74 are spaced to correspond with the arrangement of knife grooves.

In practicing the method of this invention a plurality of endless non-extensible cores 13 are arranged to encompass the drums 10 and 11 and seated in the grooves 12 provided therefor.

The spacing of the drums may then be adjusted to tension the cores as by adjustment of the hand wheel 26 of the device just described. The roller 64 is brought into engagement with the cores 13 on the drum 10 and a sheet of unvulcanized rubber material is fed between the cores 13 and the roller 64, the drum 10 being rotated for this purpose, preferably at a slow speed. The roller 64 causes the sheet material to be pressed into adhesive engagement with the cores 13 which become embedded therein. Successive convolutions of sheet material are applied until a body of such material of the proper thickness has been applied as indicated by the numeral 77. The knife blades 74 are now pressed against the material during continued rotation of the drum to sever the band of material between sets of cores 13 and in alignment with the clearance grooves 76. The drum 10 may be rotated at a higher velocity during the cutting operation if desired.

The provision of the grooves in the drums 10 and 11 assures accurate spacing of the cores with each other and with the knife blades and therefore assures accurate location of the cores with respect to the margins of the belts and prevents cutting of the cores due to mis-alignment. The adjustment of the drums assures the cores being properly tensioned when the rubber is applied and the grooves in the drums permit location of the cores at one side of the belt. The separated belt bodies are slacked for removal from the drums by rotation of the screw 24 and after removal from the drums they are covered with fabric or other covering material 80 and are enclosed in molds and subjected to vulcanization preferably in molds adapted to press the belts into trapezoidal form as shown in Fig. 5. Prior to the molding operation the belt bodies are turned inside out to bring the cord cores to the outer periphery of the belt.

I claim:
1. The method of making endless transmission belts which comprises supporting a plurality of endless cores in spaced relation, tensioning the cores, applying a layer of moldable composition to the outer faces of said cores, and slitting the resulting endless band of material between cores to provide a plurality of endless belt bodies.

2. The method of making endless transmission belts which comprises supporting a plurality of endless cores in groups of parallel cores, applying a layer of moldable composition to the outer faces of said cores, slitting the resulting endless band of material between groups of cores to provide a plurality of endless belt bodies each comprising a plurality of cores, applying a cover to each belt body, and vulcanizing the belts so formed.

3. The method of making endless transmission belts which comprises supporting a plurality of endless cores in spaced relation, tensioning the cores, adhesively applying a layer of binding material to the outer faces of the cores to maintain the relation of adjoining cores, and slitting the material between cores to provide a plurality of endless belt bodies.

4. The method of making endless transmission belts which comprises arranging a plurality of endless cores in spaced parallel relation, applying tension to said cores, applying a layer of material to the outer faces of the cores to maintain their spaced arrangement and provide a body for the belts, and slitting said material between cores to provide a plurality of belt bodies.

5. The method of making endless transmission belts which comprises supporting a plurality of endless cores in spaced relation, adhesively applying a layer of binding material to the outer faces of said cores, slitting the endless band so formed between cores to provide a plurality of belt bodies, covering said bodies with a cover, reversing said bodies and vulcanizing the belts so formed.

6. Apparatus for making endless transmission belts, said apparatus comprising a pair of spaced drums for supporting a plurality of belt cores, said drums being grooved to determinately position the cores in spaced relation, means for driving one of said drums, means for forming a sheet of plastic material over the exposed portions of the cores, and means for slitting the band of material so formed between adjacent cores.

7. Apparatus for making endless transmission belts, said apparatus comprising a pair of spaced drums for supporting a plurality of belt cores, said drums being grooved to determinately space said cores, means for driving one of said drums, pressing means for engaging the material on said last named drum, and slitting means adapted to slit material overlying said cores on said drum between adjacent cores, said drum being grooved to provide clearance spaces for receiving said slitting means.

8. Apparatus for making endless transmission belts, said apparatus comprising a pair of spaced drums for supporting a plurality of belt cores, said drums being grooved to determinately space said cores, means for driving one of said drums, means for applying sheet material in adhesive contact with a plurality of cores on said drums, means for tensioning said cores, and slitting means for severing the applied material between groups of cores to provide belt bodies, said driven drum being formed to clear said slitting means.

9. Apparatus for making endless transmission belts, said apparatus comprising a pair of core-supporting drums grooved to determinately space a plurality of belt cores, means for driving one of said drums, means for applying sheet material to said cores and to partially embed the cores in said material, and means for slitting said material between groups of cores to provide a plurality of belt bodies, said driven drum being grooved to clear said slitting means.

WALTER B. FREEMAN.